Feb. 15, 1966    R. A. ELM    3,235,833
CABLE AND CONNECTOR THEREFOR
Original Filed May 3, 1961    2 Sheets-Sheet 1
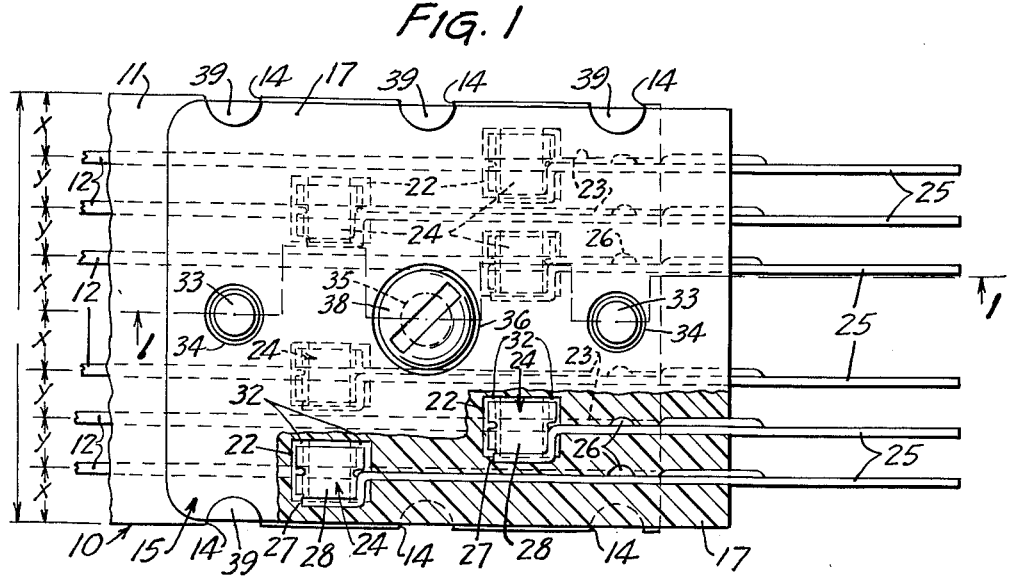
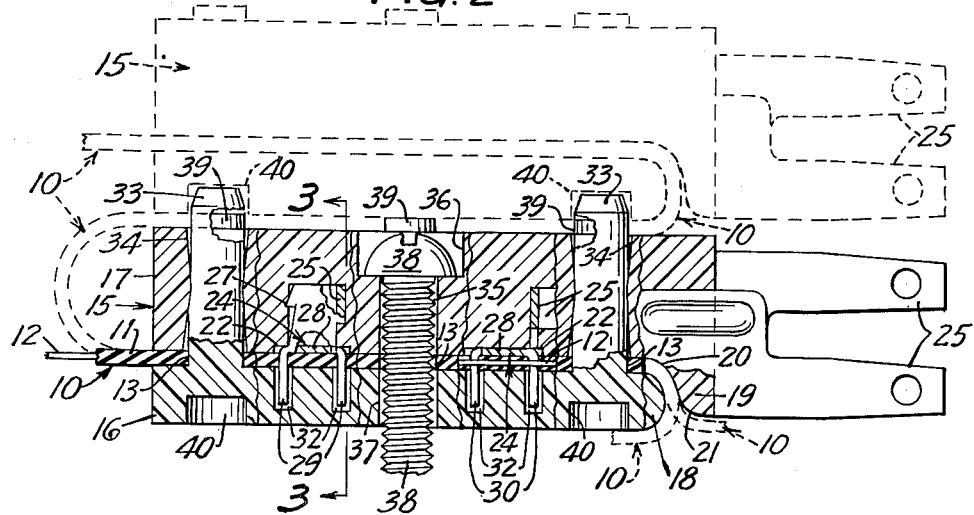
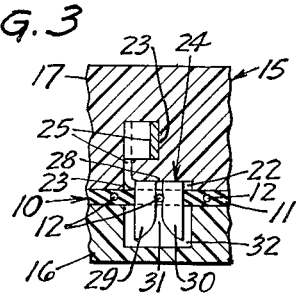
INVENTOR
ROBERT A. ELM
BY
Carpenter Abbott Coulter & Kinney
ATTORNEYS

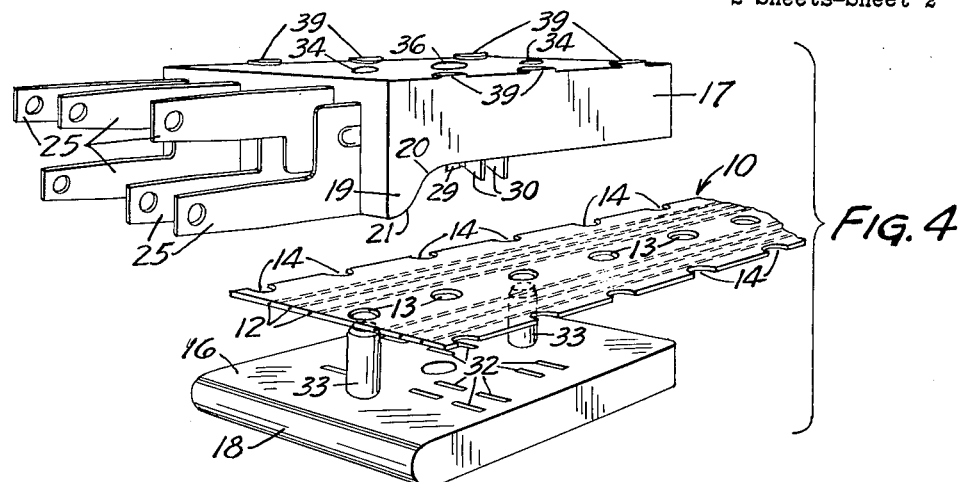
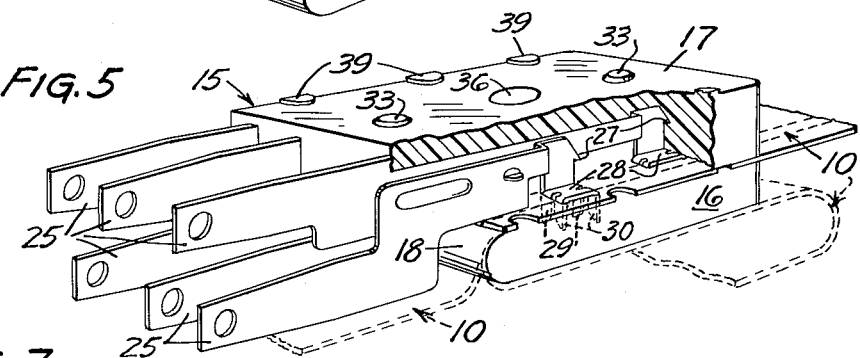
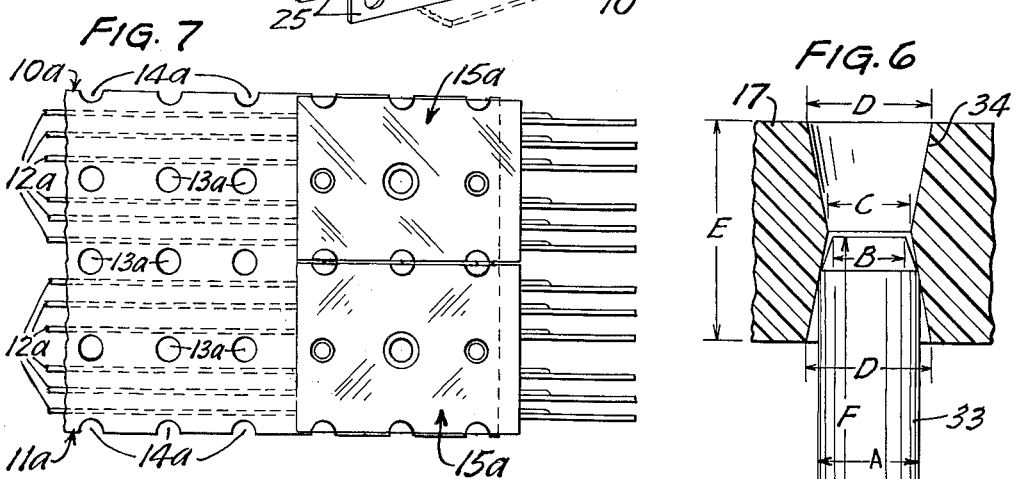
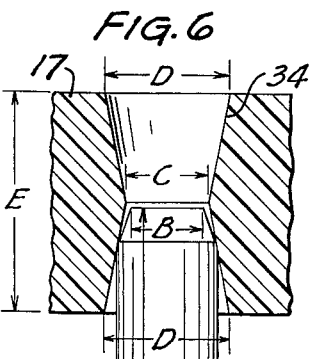
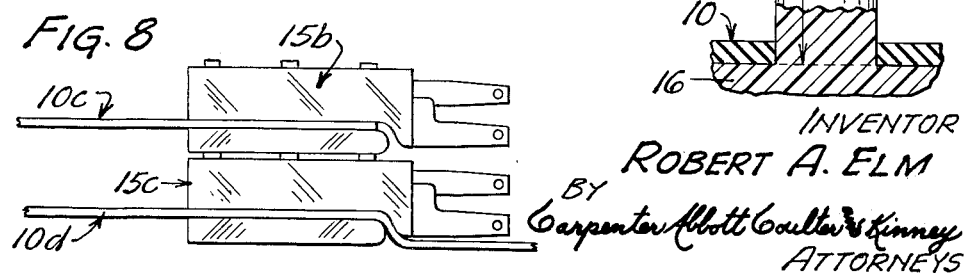
INVENTOR
ROBERT A. ELM

United States Patent Office 3,235,833
Patented Feb. 15, 1966

3,235,833
CABLE AND CONNECTOR THEREFOR
Robert A. Elm, St. Paul, Minn., assignor to Minnesota Mining and Manufacturing Company, St. Paul Minn., a corporation of Delaware
Continuation of application Ser. No. 107,381, May 3, 1961. This application Aug. 10, 1964, Ser. No. 389,520
16 Claims. (Cl. 339—97)

This is a continuing application, being based on copending application Serial No. 107,381 filed May 3, 1961, and now abandoned.

This invention relates to improvements in multiple conductor flat cable and to improvements in electrical connector assemblies for use with such improved flat cable.

Modern electronic technology has created new needs in wiring techniques. Miniaturization of equipment and components has resulted in definite requirements for conservation of space and weight in wiring systems. The labor cost involved in stripping insulation, handling individual wires, and attaching connectors has produced a demand for more rapid and simple wiring systems.

Printed circuit boards and cables with multiple flat conductors have been developed in answer to some of the wiring problems created by modern electronic technology. The difficulty in rapidly making reliable connections to conventional flat conductors and the inflexibility of possible applications are problem areas of the prior art to which the present invention is directed.

Flat cables comprising a plurality of small diameter round wire conductors arranged in spaced parallel side-by-side relation within a flat plastic body or insulating strip have many advantages not afforded by single or multiple conductor wires or cables of conventional construction. Flat cables of the character under consideration are particularly useful in electronic and telephone circuitry and are well adapted for use in numerous other fields.

The present invention provides a round-wire flat cable of improved construction and a connector assembly of improved construction complemental to that of the aforesaid flat cable, said connector assembly being adapted for quick and simple application to the improved cable for effectuation of positive permanent electrical contact with the conductors thereof. Both the improved cable and the improved connector assembly are relatively simple and inexpensive in construction and can be readily fabricated by mass production techniques.

The improved cable and connector assembly structures are provided with cooperating locating means insuring precise positioning of the connector elements of the assembly with respect to the conductors within the cable. Both the improved flat cable and the improved connector assembly are modular in construction, permitting multiple connector assemblies to be associated with the improved cable in vertically stacked and/or side-by-side relation. The invention further contemplates an improved connector construction having novel means for removably holding the parts thereof assembled to the improved cable.

The invention can perhaps be best understood by reference to the drawings accompanying and forming a part of this specification wherein:

FIGURE 1 is a plan view of an extent of the improved flat cable to which one of the improved connector assemblies is attached in operative position, parts being broken away and shown in section;

FIGURE 2 is a longitudinal vertical sectional view taken approximately along the irregular line 1—1 of FIGURE 1, there being shown in dot and dash lines a second connector assembly in vertically stacked relation, and an alternative path for the flat cable;

FIGURE 3 is a fragmentary transverse vertical sectional view taken along the line 3—3 of FIGURE 2;

FIGURE 4 is an exploded perspective view showing the parts of the improved connector assembly about to be applied to an extent of the improved flat cable;

FIGURE 5 is a view similar to FIGURE 4 showing the parts of the connector assembly in operative position on the illustrated flat cable, parts being broken away and shown in section, and alternative paths for the flat cable being shown in dot and dash lines;

FIGURE 6 is an enlarged fragmentary vertical sectional view of the improved connector assembly showing a connector pin disposed with the tip portion thereof inserted part way into a receiving bore in the body portion of the improved connector;

FIGURE 7 is a plan view illustrating a pair of the improved connectors applied to an extent of the improved flat cable in side-by-side relation; and FIGURE 8 is a side elevational view showing a pair of the improved connectors in vertically stacked relation, each of said connectors being applied to a separate flat cable.

Referring more particularly to FIGURES 1 to 3 of the drawing, there is illustrated therein a flat cable 10 comprising an electrically insulating flat plastic body 11 in the form of a strip or tape having embedded therein a plurality of small diameter conductors 12 arranged in spaced parallel side-by-side relation. The conductors 12 are preferably arranged in equally spaced similar groups which, in the illustrated forms of the improved cable, are groups consisting of three equally spaced conductors each. The improved cable preferably contains two or more similar spaced groups of conductors 12. In FIGURES 1 and 4, the cable 10 illustrated therein contains two similar spaced groups of three conductors 12 each, whereas in FIGURE 7 the illustrated cable 10a is twice as wide as the cable 10 and contains four similar groups of three equally spaced conductors 12a each. The improved flat cable may be made in any desired width and may contain any desired number of similar equally spaced groups of conductors. In the flat cable constructions illustrated in FIGURES 1, 4 and 7, the spacing between adjacent groups of conductors is greater than the spacing between the adjacent conductors of a given group.

Typically, the conductors of the improved cable are of No. 26 or No. 28 gauge solid or stranded copper wire. In manufacturing an exemplary flat cable, No. 28 ga. (.0126 inch) solid copper wires, suitably aligned and held under moderate tension, are fed between composite films, each having an inner layer (.0045 inch thick) of polyethylene and an outer layer (.0015 inch thick) of oriented polyester film, the whole being pressed and bonded together into a unitary structure between a compressible rubber roller and a heated steel roller having shallow circumferential grooves corresponding with the wire positions. The resultant substantially flat cable ranges in thickness from approximately .012 inch to .017 inch. The web of the plastic body is then perforated or notched between and beyond the groups of wires in a uniform pattern, e.g. as illustrated in FIGURE 7.

With reference to FIGURE 1, the spacing Y between the center lines of the conductors of a given group is .075 inch. The outer edges of the body 11 are spaced from the center line of the nearest conductors a distance X of .075 inch, and the distance between the closest conductors of adjacent groups is preferably a distance 2X. These spacings make possible a connector block covering two groups of wires and having six uniformly spaced external connector lugs separated from each other by a distance of .100 inch, as required in many circuits for conveniently making connection to external circuitry.

The plastic body must be capable of being pierced by the metal contact arms 29 and 30 of the connector elements, as hereinafter will be described.

The web of the plastic body is perforated or notched in the manufacturing process to accommodate positioning means of associated connector assemblies. For example, as shown most clearly in FIGURES 4 and 7, the perforations and notches provide positioning means for cooperation with complemental positioning means on the improved connector assembly to precisely locate said connector assembly on the cable as will hereinafter appear. In the illustrated embodiment the aforementioned positioning means on the improved cable may be considered to comprise shoulder means in the form of equally spaced circular recesses or apertures 13 (FIGURE 4) or 13a (FIGURE 7) alined longitudinally along the center line of the space between each pair of adjacent groups of conductors. As shown in FIGURE 7, where the cable contains more than two groups of conductors, the apertures 13a are in transverse as well as longitudinal alinement. The positioning means provided by the improved cable also includes shoulder or aperture means in the form of semi-circular notches or recesses 14 (FIGURE 4) and 14a (FIGURE 7) formed in the opposite edges of said cable in transverse alinement with the apertures 13 and 13a respectively as shown. Preferably the spacing of the shoulder means is identical in both directions, so as to facilitate the interconnecting of cable sections overlapped at right angles to each other. The notches or recesses 14 or 14a have the same radius of curvature as the apertures 13 and 13a, and the centers of curvature thereof are located at the edges of the improved tape cable. It is to be understood that throughout the specification and claims the terms "perforation" and "shoulder means" refer to both the circular and semi-circular recesses.

The improved cable readily lends itself to the separation of certain groups of conductors from other groups in the same cable by a simple slitting or cutting operation performed along selected rows of openings 13a. To this end the invention contemplates a cable construction wherein the flat body 11 or 11a is formed in one or both surfaces thereof with a longitudinal groove (not shown) extending longitudinally along the center lines of the openings 13 and 13a, connecting adjacent openings and affording linear areas of reduced thickness of the flat plastic body facilitating tearing of said body along said grooves without the necessity of using a cutting tool. It will be observed that when a cable such as the cable 10a of FIGURE 7 is cut or torn longitudinally as aforedescribed, each opening 13a through which the cutting is effected forms two notches 14a, one on each side of the cut.

Referring to FIGURES 1 to 5, an exemplary embodiment of the improved connector is indicated generally by the numeral 15 and comprises complemental base and body members 16 and 17 respectively which are generally rectangular in plan view. The base and body members 16 and 17 are preferably formed of an electrically insulating elastic plastic material, the presently preferred plastic being polycarbonate. Other plastics having the desired characteristics may be used, examples of which are nylon, polyethylene, polypropylene, polyvinyl butyral. The base member 16 has a rounded convex front edge surface 18 and the body member 17 has a depending or offset frontal portion 19 (FIGURES 2 and 4) providing the lower surface of said body member with a concave surface portion 20 complemental to the rounded edge surface 18 and terminating in a convex surface portion 21.

As shown most clearly in FIGURES 1 to 3, the undersurface of the body member 17 is formed with a plurality of shallow rectangular recesses 22 arranged in groups of three with their longitudinal axes in the same spatial arrangement as the axes of the conductors 12 of cable 10. The underside of the body member 17 is also formed with a plurality of longitudinally extending grooves extending from the recesses 22 toward and through the frontal portion 19 of said body member. The grooves 23 have generally Z-shaped inner end portions above the shallow recesses 22. Each recess 22 accommodates a portion of a connector element 24 having an integral elongated leg portion 25 which is accommodated within the groove 23 associated with said recess. The connectors 24 are held in operative relation with respect to the body 17 by offset barb portions 26 (FIGURE 1) and 27 (FIGURE 2) formed on the leg portions 25 and which penetrate the plastic of said body upon insertion of the leg portions 25 in the grooves 23. However, if a permanent installation is desired and disassembly is not required, the barbed portion 27 (FIGURE 2), which would ordinarily hold the connector element 24 permanently in position within the body member 17 when the base and body members are separated, can be eliminated. Eliminating that barbed portion, as well as providing a small cavity in the body member above and on either side of the connector element 24, permits a slight lateral movement of the connector elements 24 which facilitates alignment with the individual conductors during assembly of the connector on the cable, so that less rigid dimensional specifications may be tolerated.

The leg portions 25 extend beyond the front end of the body member 17 and are of a length to terminate in the same transverse vertical plane, the outer terminal portions of adjacent legs 25 being vertically offset from each other, as shown most clearly in FIGURES 2, 4 and 5, to afford maximum spacing therebetween and thereby facilitate electrical connection thereto, for example by soldering. By suitable additional offsetting, the six terminal portions may be uniformly spaced, as previously noted.

As shown most clearly in FIGURES 1 to 3, each connector 24 has a generally rectangular flat base segment 28 which lies within the accommodating recess 22 with the lower surface of said segment substantially coplanar with the surrounding lower surface portion of the body member 17. Depending from the front and rear edges of the body segments 28 are spaced pairs of pointed contact arms 29 and 30 defining therebetween an open mouthed slot 31 shown most clearly in FIGURE 3. A single pair of pointed contact arms produces a fully acceptable contact, the second pair here serving essentially as a safety factor. When it is desired to effect connection with conductors in cables crossed at right angles, two pairs of contact arms are placed at right angles with each other, the cavities in the insulating base and body members being appropriately modified to accept the said contact arms.

The upper face of the base member 16 is formed with a plurality of narrow transverse slots 32 positioned to receive the pointed segments 29 and 30 of connectors 24 when the connector assembly 15 is assembled in operative position on a flat cable 10 as will hereinafter more fully appear. The base member 16 is also formed with locating or positioning and connector means cooperable with the locating or positioning apertures 13 or 13a of the improved cable 10 or 10a and also cooperable with complementary connection means on the body member 17. In the illustrated embodiment the locating or connector means on the base member 16 takes the form of a pair of upstanding normally cylindrical pins 33 which are integral with the base member 16. The pins 33 are located along the longitudinal center line of the base member 16 and the axes thereof are spaced apart a distance twice the longitudinal spacing between the centers of longitudinally adjacent openings 13 or 13a in the cables 10 or 10a. In the presently preferred embodiment, the spacing between the centers of both longitudinally and transversely adjacent openings 13 or 13a of cables 10 or 10a respectively is .300 inch, and the spacing between the axes of the pins 33 is .600 inch. The apertures 13 and 13a are preferably of uniform diameter, and the pins 33 have a normal diameter sized to have a snug but freely slidable fit in said apertures.

The means on the body member 17 complemental with the pins 33 comprises a pair of spaced vertical bores 34, the axes of which are spaced apart the same distance as the axes of the pins 33. As shown most clearly in FIGURE 6, the bores 34 taper from the ends thereof toward a medial reduced diameter portion indicated by the letter C. The outer end portions of the bores 34, indicated by the letter D, is greater than the normal diameter of the pins 33 indicated by the letter A, whereas the restricted bore portion C is somewhat smaller than the normal diameter of the pins 33. The improved connector assembly may be attached to the improved flat cable at any selected position along the length or (in the case of wider flat cable such as the cable 10a of FIGURE 7) width. Such attachment is effected, for example to the cable 10, by first inserting the pins 33 of the base member 16 through a longitudinally alined pair of openings 13 in said cable, and then inserting the tips of said pins into the complementary bores 34 of the body member 17. The pins 33 and bores 34 aline the connectors 24 carried by the body member 17 with the respective conductors 12 in the cable and also aline the pointed segments 29 and 30 of said connectors with the receiving slots 32 in the base member 16. The base and body members 16 and 17 are then pressed together, either manually or with a suitable tool, to bring said base and body members into clamping engagement with the opposite surfaces of the cable. This action forces the pins 33 into the bores 34 while at the same time causing the pointed segments 29 and 30 of the connectors 24 to penetrate through the plastic body 11 of the cable on opposite sides of the conductors 12 alined therebetween and to enter the receiving slots 32. A wiping or sliding metal to metal contact is effected between segments 29 and 30 and the alined conductor 12, and said segments are forced apart slightly as said conductor enters the slot 31 (FIGURE 3). The connector 24 is made of relatively hard resilient metal, for example beryllium copper, and the resilience of the connector base segment 28 affords a spring reserve whereby the tendency of said base segment to return the pointed segments 29 and 30 to their normal positions maintains fully effective electrical contact of said pointed segments with the associated conductor 12. The slots 32 are only slightly thicker than the pointed segments 29 and 30 positioned therein, so that the cable 10 is firmly clamped between the base and body members 16 and 17 closely adjacent both the front and rear surfaces of each of the segments 29 and 30.

The base and body members 16 and 17 are held in the assembled position shown in FIGURES 1, 2 and 5 by the coaction of the pins 33 and bores 34. As the pins 33 are forced into the bores 34, said pins are reduced somewhat in diameter at portions thereof passing the restricted portion C (FIGURE 6) of said bores, and said restricted diameter portion C is simultaneously somewhat enlarged, such action being permitted by the inherent elasticity of the plastic of which the pins 33 and body member 17 are made. After the parts are in the positions shown in FIGURES 2 and 5, limited movement of the plastic of the pins 33 and body member 17 takes place, tending to relieve the stresses which have been set up therein by insertion of said pins within the bores 34. This movement, called cold flow or creep, produces diametric growth of the tip portions of the pins 33 which had been reduced by having been pressed through the reduced diameter portion C of the bores 34, as well as a diametric growth of both the pins 33 and bores 34 at said reduced diameter portion C. Most of this cold flow appears to take place within five minutes of insertion of the pins 33 in the bores 34, and it appears to be substantially complete within 24 hours. The conformance of the pins 33 to the generally hour glass shape of the portions of the bores 34 in contact therewith provides a self-locking rivet type connection which securely retains the base and body members 16 and 17 in clamping engagement with the cable 12. This connection is, however, selectively reopenable by simply applying a separating force to the members 16 and 17, for example with a prying tool inserted therebetween. The illustrated embodiment has a pair of pins extending from the base member and corresponding bores in the body member, and such arrangement is preferred for ease both of manufacture and of assembly. However any combination of pins and bores, e.g. a pin and bore on the base member and a corresponding bore and pin on the body member, permits effective alignment of connector and cable.

With reference again to FIGURE 6, the following values for the dimensions indicated therein have been found to be satisfactory in the practice of the invention. The normal diameter A of the pin body is .090 inch, the diameter B of the pin tip is .070 inch, and the length F of the pin is .270 inch. The diameter D of the ends of the bore 34 is .095 inch, and the normal diameter C of the restricted portion of said bore is .080 inch. The thickness E of the body member 17 is .190 inch, this also being the length of the bores 34. After the parts of the pin and body member 17 initially dimensioned as indicated have come to equilibrium following placement in the assembled relation shown in FIGURES 1 to 3 and 5, the diametric dimension of the bore 34 and pin 33 at C is .085 inch.

As shown most clearly in FIGURE 2, the body member 17 is formed with a vertical bore 35 the axis of which is disposed in the plane of the axes of the bores 34 and is spaced midway between said bores, the bore 35 also being provided with a counterbore 36. The base member 16 is formed with a vertical bore 37 the axis of which is in the plane of the axes of the pins 33 and is spaced midway between said pins. It will be observed that when the parts are disposed as shown in FIGURE 2 the bores 35 and 37 are in registration with each other, as well as with the opening 13 of the cable 10 between the openings 13 through which the pins 33 extend. The bores 35 and 37 and the registering flat cable opening 13 thus provide means for accommodation of a mounting screw 38, should it be desired to affix the connector assembly 15 to a suitable support (not shown).

The upper surface of the body member 17 is formed at the side edges thereof with integral semi-cylindrical spacer pads 39 which are transversely alined with the bores 34 and 35 and which have a radius of curvature which is the same as or slightly less than the radius of the cable openings 13 or 13a. The transverse spacing between the axes of the bores 34 or 35 and the centers of curvature of the pads 39 transversely alined therewith is the same as the transverse distance between the centers of the transversely alined openings 13a in the cable 10a, and is also the same as the distance between the centers of the openings 13 of the cable 10 and the centers of the edge recesses 14 transversely alined therewith. The height of the pads 39 is preferably equal to the maximum thickness of the cable 10. The base member 16 is formed in its lower surface with cylindrical recesses or openings 40 coaxial with the pins 33 and having a diameter slightly larger than the normal diameter of said pins.

The pads 39 and recesses 40 facilitate vertical stacking of more than one of the improved connector assemblies 15. FIGURE 2 illustrates in dot and dash lines a second connector assembly 15 stacked in vertical alinement with the assembly 15 shown in solid lines therein. It will be observed that the superimposed assembly rests upon the spacer pads 39, and that the vertically projecting tips of the pins 33 of the lower assembly extend into the recesses 40 of the upper assembly. It will also be observed that the recesses 40 are of sufficient depth that the upper ends of the pins 33 of the lower assembly do not engage the bottom walls of said recesses of the upper connector assembly. The pins 33 do, however, cooperate with the recesses 40 of the assembly stacked thereabove to vertically aline the upper assembly with the lower as shown. Vertically stacked assemblies may be held together and may, if desired, be fixed to a suitable support (not shown) by means of a connecting or mounting screw (not shown) of suitable length corresponding to the mounting screw 38 (FIGURE 2) and passing through all of the connector assemblies in a given stack. Such a connecting or mounting screw, of course, also affords vertical alinement means in addition to that afforded by the coaction of pins 33 and recesses 40.

In FIGURE 2 alternative paths for the cable 10 are shown in dot and dash lines illustrating that the vertically stacked assemblies 15 can effect electrical connection with a single cable 10. With such an arrangement, the cable 10 follows a serpentine path in which extents thereof pass through both the stacked assemblies 15, and in intermediate extent thereof is interposed between the stacked assemblies. As for said intermediate extent, the edge notches or recesses 14 therein accommodate the pressure pads 39 of the lower assembly, and the tips of the pins 33 of said lower assembly pass through openings 13 in said extent. The cable 10 may terminate within the connector assembly 15 as shown in solid lines in FIGURE 2, or it may extend forwardly or rearwardly from the front portion thereof as indicated in dot and dash lines in said figure. Such alternative paths for the cable 10 are also illustrated in dot and dash lines in FIGURE 5. The complemental curved surfaces 18 and 20 on the base and body members 16 and 17, as well as the convex surface 21 on member 17, insure smooth bending of the cable 10 and direct said cable in a manner to eliminate interference, for example, with an associated connector assembly.

FIGURE 8 illustrates vertical stacking of two of the improved connector assemblies 15b and 15c respectively connected to separate flat cables 10c and 10d. The cable 10c is shown as terminating within the assembly 15b, whereas the cable 10d is shown as being continued forwardly from the assembly 15c. Thus the assembly 15b affords a terminal connection, whereas the assembly 15c affords a tapping connection.

FIGURE 7 illustrates two connector assemblies 15a affixed in side-by-side relation to the flat cable 10a. To facilitate such side-by-side placement, the width of the base and body members 16 and 17 is such that the transverse distance between the plane of the axes of the pins 33 and bores 34 and the planes of side edges of the members 16 and 17 is slightly less than the transverse distance between the centers of adjacent transversely alined openings 13a in the tape 10a. As shown in FIGURE 7, the width of the assemblies 15a is such that there is a small space between such assemblies when attached in side-by-side relation on the same cable 10a, thereby avoiding interference between adjacent assemblies 15a thus attached.

The connector illustrated in the drawing provides for direct permanent connection between the wires of the flat cable and wires attached to external circuitry, the latter being wrapped around and soldered to the external lugs 25. An alternative structure, not shown, permits temporary disconnection of the circuitry by substituting for the connector illustrated a plug and jack arrangement. As an example, the lugs 25 may be replaced by socket type terminals within an extended insulating body, and a further member supplied with cooperative plug members terminating in external lugs similar to lugs 25; or the lugs 25 of the connector illustrated may be converted to plug members for insertion into suitable sockets in a cooperating intermediate connector member. Suitable polarizing members are desirably incorporated in such plug and socket members to assure correct positioning of the connections. For example one piece is provided with a polarizing pin having a T-shaped cross-section and fitting within a correspondingly T-shaped cavity in the opposing piece.

Having thus described the invention with reference to the disclosed embodiments of the improved flat cable and connector assembly for use therewith, it is to be understood that the illustrated forms were selected to facilitate the disclosure of the invention, rather than to limit the number of forms which it may assume. Various modifications, adaptations and alterations may be applied to the specific forms shown to meet the requirements of practice, without in any manner departing from the spirit or scope of the present invention, and all of such modifications, adaptations and alterations are contemplated as may come within the scope of the appended claims.

What is claimed is as follows:

1. In combination a flat cable comprising a plurality of parallel electrical conductors in spaced side-by-side relationship within an elongated substantially flat plastic insulating body, and a plurality of connector assemblies each comprising complementary base and body members engaging opposite surfaces of said flat body, connector members effecting electrical connection with said conductors, and means for connecting the associated complementary base and body members of said assemblies to hold said members in engagement with said flat body and to aline said connector members with said electrical conductors, said assemblies being stacked one above the other with a portion of the flat cable interposed therebetween, at least one of the base and body members of one of said stacked assemblies being formed with spacer means to engage the next adjacent assembly and maintain said engaged assembly spaced therefrom a distance substantially equal to the thickness of said flat body.

2. In combination a flat cable comprising a plurality of parallel electrical conductors in spaced side-by-side relationship within an elongated substantially flat plastic insulating body formed with spaced locating apertures, and a plurality of connector assemblies each comprising complementary base and body members engaging opposite surfaces of said flat body, connector members effecting electrical connection with said conductors, and means extending through at least one of said locating apertures in said flat body for connecting the associated complementary base and body members of said assemblies to hold said members in engagement with said flat body and to aline said connector members with said electrical conductors, said assemblies being stacked one above the other with a portion of the flat cable interposed therebetween, at least one of the base and body members of one of said stacked assemblies being formed with spacer means also extending through said apertures in said flat body to engage the next adjacent assembly and maintain said engaged assembly spaced therefrom a distance substantially equal to the thickness of said flat body.

3. In combination, a flat cable comprising a plurality of parallel electrical conductors in spaced side-by-side relationship within an elongated substantially flat plastic insulating body formed with spaced locating apertures, and a plurality of connector assemblies each comprising complementary base and body members engaging opposite surfaces of said flat body, connector members effecting electrical connection with said conductors, and means extending through at least one of said locating apertures in said flat body for connecting the associated complementary base and body members of said assemblies to hold said members in engagement with said flat body and to aline said connector members with said electrical conductors, said assemblies being stacked one above the other with a portion of the flat cable interposed therebetween, at least one of the base and body members of one of said stacked assemblies being formed with at least one projection also extending through an aperture in said flat body, and at least one of the base and body members of the next adjacent stacked assembly being formed with a recess into which said projection extends to maintain said stacked assemblies in vertical alinement with each other.

4. In combination a flat cable comprising a plurality of parallel electrical conductors in spaced side-by-side relationship within an elongated substantially flat plastic insulating body, said body being formed with a succession of regularly spaced locating apertures, and a connector assembly in operative association with said flat cable, comprising complementary base and body members engaging opposite surfaces of said flat body, one of said base and body members carrying connector members effecting electrical connection with said conductors, and one of said base and body members being provided with at least one projection, comprising a solid cylindrical pin of elastic plastic material, extending through at least one of said locating apertures in said flat body to aline said connector members with said electrical conductors, the other of said base and body members including means cooperable with said projection and comprising a bore having a reducing taper extending from one end thereof to a reduced diameter portion, said pin having a constant normal diameter smaller than that of said one end of said bore and larger than that of said reduced diameter bore portion, and said pin being pressed into said one end of said bore and extending beyond said reduced diameter bore portion and elastically conforming to the shape of the bore portions in contact therewith, said conformed pin resisting withdrawal thereof from said bore and thereby retaining said base and body members in engagement with said flat body.

5. In combination a flat cable comprising a plurality of parallel electrical conductors in spaced side-by-side relationship within an elongated substantially flat plastic insulating body, said body having recessed shoulder means at each of a plurality of locations regularly spaced longitudinally thereof, and a connector assembly in operative association with said cable, comprising complementary base and body members engaging opposite surfaces of said flat body, one of said base and body members carrying connector members penetrating said plastic body and effecting electrical connection with at least some of said conductors, and at least one of said base and body members being provided with projecting shoulder means cooperable with said recessed shoulder means to aline said connector members with said electrical conductors, the other of said base and body members being provided with securing means cooperable with said projecting shoulder means for fastening said complementary base and body members to each other and at corresponding locations on opposite surfaces of said flat body at a predisposed location intermediate the ends of said cable.

6. In combination a flat cable comprising a plurality of parallel electrical conductors in spaced side-by-side relationship within an elongated substantially flat plastic insulating body, said body being formed with a succession of regularly spaced locating apertures, and a connector assembly in operative association with said flat cable, comprising complementary base and body members engaging opposite surfaces of said flat body, one of said base and body members carrying connector members effecting electrical connection with said conductors, and one of said base and body members benig provided with a plurality of alignment means for aligning said connector members with said electrical conductors and including at least one projection, comprising a solid cylindrical pin of elastic plastic material, extending through and beyond at least one of said locating apertures in said flat body, the other of said base and body members including means cooperable with said projection and comprising a bore of a size permitting a snug fit with said pin, and said pin being pressed into and extending beyond said bore and resisting withdrawal from said bore for retaining said base and body members in engagement with said flat body, the extended portion of said pin being adapted for engaging a recess in a similar connector assembly stacked thereabove.

7. In combination a flat cable comprising a plurality of parallel electrical conductors in spaced side-by-side relationship within an elongated substantially flat plastic insulating body, said body being formed with a succession of regularly spaced locating apertures, and a connector assembly in operative association with said flat cable, comprising complementary base and body members engaging opposite surfaces of said flat body, one of said base and body members carrying connector members effecting electrical connection with said conductors, and one of said base and body members being provided with at least one projection, comprising a solid cylindrical pin of elastic plastic material, extending through and beyond at least one of said locating apertures in said flat body to aline said connector members with said electrical conductors, the other of said base and body members including means cooperable with said projection and comprising a bore of a size permitting a snug fit with said pin, and said pin being pressed into and extending beyond said bore and resisting withdrawal from said bore for retaining said base and body members in engagement with said flat body, the extended portion of said pin being adapted for engaging a recess in a similar connector assembly stacked thereabove.

8. A connector assembly for effecting electrical connection with individual parallel conductors of a multiple conductor flat cable having an elongated flat insulating body formed with a plurality of substantially equally spaced longitudinally alined locating apertures, said assembly comprising in combination, complementary base and body members, one of said base and body members carrying mutually transversely separated connector members adapted to effect electrical connection with individual conductors of an associated flat cable, one of said base and body members being formed with at least two bores adapted to register with a pair of locating apertures of an associated flat cable, the other of said base and body members being provided with a connector and guide pin adapted to extend through an aperture in an associated flat cable and within one of said bores in said one member for connection of said base and body members to each other, said other member being formed with a bore adapted to register with the other of said bores of said one member when said pin is disposed within said one bore thereof, said other bore in said one member and said bore in said other member being adapted to accommodate a screw positioned therein and extending through a locating aperture in an associated flat cable.

9. A connector assembly for effecting electrical connection with individual parallel conductors of a multiple conductor flat cable having an elongated flat insulating body formed with a plurality of substantially equally spaced longitudinally alined locating apertures, said assembly comprising in combination, complementary base and body members, one of said base and body members carrying mutually transversely separated connector members adapted to effect electrical connection with individual conductors of an associated flat cable, one of said base and body members being formed with at least two bores adapted to register with a pair of locating apertures of an associated flat cable, and the other of said base and body members being provided with a pair of connector and guide pins adapted to extend respectively through a pair of apertures in an associated flat cable and respectively within said bores in said one member for connection of said base and body members to each other.

10. A connector assembly for effecting electrical connection wtih individual parallel conductors of a multiple conductor flat cable having an elongated flat insulating body formed with a plurality of substantially equally spaced longitudinally alined locating apertures, said assembly comprising in combination complementary base and body members, one of said base and body members carrying mutually transversely separated connector members adapted to effect electrical connection with individual conductors of an associated flat cable, one of said base and body members being formed with three spaced alined bores adapted to register with three alined locating apertures of an associated flat cable, the other of said base and body members benig provided with a pair of connector and guide pins adapted to respectively extend through a pair of apertures in an associated flat cable and within two of said bores in said one member for connection of said base and body members to each other, said other member being formed with a bore adapted to register with the third bore in said one member when said pins are disposed within said pair of bores thereof, said third bore and said bore in said other member being adapted to accommodate a mounting screw positioned therein and extending through a locating aperture in an associated flat cable.

11. A connector assembly for attachment to a flat cable or the like having an elongated flat flexible body, comprising in combination a flat plate-like base member having opposite generally parallel first and second surfaces connected along one margin by a rounded edge surface, and a body member having a flat surface adapted to be placed in registry with said base member on the opposite side of an associated flat cable clamped between said first surface and said body member surface, said body member having an offset end portion formed wtih a concave surface complemental to said rounded edge portion of said base member, said end portion being adapted to direct a clamped flat cable transversely over said rounded edge surface to project generally normal to said first and second surfaces of said base member, said end portion also being formed with a convex surface portion around which said projecting portion of a clamped flat cable can be bent away from said base member and generally parallel with the plane of said second surface of said base member, said rounded edge of said base member also affording a surface around which a clamped flat cable can alternatively be bent into engagement with said second surface of said base member.

12. A connector assembly for effecting electrical connection with individual parallel conductors of a multiple conductor flat cable having an elongate flat insulating body formed with a plurality of substantially equally spaced longitudinally alined locating apertures, said assembly comprising in combination, complementary base and body members, one of said base and body members carrying mutually transversely separated connector members adapted to effect electrical connection with individual conductors of an associated flat cable, one of said base and body members being provided with at least one bore and at least one connector and guide pin, said bore and pin adapted respectively to register with one and to extend through the other of a pair of locating apertures of an associated flat cable, the other of said base and body members being provided with at least one connector and guide pin and at least one bore, said pin and bore of said other of said base and body members adapted respectively to extend through the one and to register with the other of said pair of locating apertures of associated flat cable, said pins adapted to extend through and beyond said bores for connecton of said base and body members to each other, the portions of the pins extending beyond the bores being adapted for engaging a recess in a similar connector assembly stacked thereabove.

13. A connector assembly for effecting electrical connection with individual parallel conductors of a multiple conductor flat cable having an elongate flat insulating body formed with a plurality of substantially equally spaced longitudinally alined locating apertures, said assembly comprising in combination, complementary base and body members, one of said base and body members carrying mutually transversely separated connector members adapted to effect electrical connection with individual conductors of an associated flat cable, said base and body members being provided with at least two interlocking pin-and-bore type connector means positioned for registry with a pair of apertures in said cable for connection of said base and body members to each other, the pins of the pin-and-bore type connector means being adapted to extend through and beyond the corresponding bores, the extended portions of the pins being adapted for engaging a recess in a similar connector assembly stacked thereabove.

14. A wide flat cable separable into cables of uniform lesser width and comprising a plurality of parallel electrical conductors in spaced side-by-side relationship and arranged in spaced groups and within an elongated substantially flat plastic insulating body formed between adjacent groups of conductors with a plurality of longitudinally and transversely alined apertures and with a narrow longitudinal groove extending along the center line of each row of longitudinally alined apertures.

15. A flexible multiple-conductor thin flat cable of any desired length and breadth, adapted for association with connector assemblies having rectangularly shaped complemental base and body members respectively provided with cooperatively disposed alignment pins and pin-receiving bores and with cooperatively disposed element-receiving recesses and connector elements, the connector elements being mutually transversely separated from each other and from the pin-receiving bores and each comprising opposed closely spaced resiliently separable pointed contact arms, the upper surface of the body members being provided with semi-circular spacer pads disposed along the edges thereof and in transverse alignment with the pin-receiving bores, said connector assemblies being attachable to said cable at any desired location along the full length and breadth of said cable for making electrical connection between the said connector elements and the corresponding conductors of said cable, said cable comprising a large number of parallel small copper wires of circular cross section extending the length of the cable and embedded in spaced side-by-side relationship and in spaced uniform groups, each group having an equal number of wires, within a thin, elongate, substantially flat, flexible, elastic plastic insulating sheet material extending laterally between and beyond said wires, said sheet material being adapted for positioning of said connector assemblies thereon by the presence of a coextensive uniform pattern of longitudinally and transversely aligned circular perforations between said groups of wires and of semi-circular notches along the longitudinal edges of the cable in transverse alignment with the perforations, said perforations and notches disposed so as to correspond with the pin-receiving bores and spacer pads of a cooperable connector assembly, said small copper wires being disposed within the cable with respect to the perforations and notches so as to correspond with the connector elements of a cooperable connector assembly, said plastic being characterized by being readily penetrated and displaced by said connector elements during pressure assembly on said cable of said connector assemblies.

16. A flexible multiple-conductor thin flat cable of any desired length and breadth, adapted for association with connector assemblies having rectangularly shaped complemental base and body members respectively provided with cooperatively disposed alignment pins and pin-receiving bores and with cooperatively disposed element-receiving recesses and connector elements, the connector elements being mutually transversely separated from each other and from the pin-receiving bores and each comprising opposed closely spaced resiliently separable pointed contact arms, the upper surface of the body members being provided with semi-circular spacer pads disposed along the edges thereof and in transverse alignment with and having the same radius of curvature as the pin-receiving bores, said connector assemblies being attachable to said cable at any desired location along the full length and breadth of said cable for making electrical connection between the said connector elements and the corresponding conductors of said cable, said cable comprising a large number of parallel small copper wires of circular cross section extending the length of the cable and embedded in spaced side-by-side relationship and in spaced uniform groups, each of three wires, within a thin, elongate, substantially flat, flexible, elastic plastic insulating sheet material extending laterally between and beyond said wires, the distance between adjacent groups of wires being about twice the distance between adjacent wires within a group and being less than twice the diameter of the alignment pins, said sheet material being adapted for positioning of said connector assemblies thereon by the presence of a coextensive uniform pattern of longitudinally and transversely aligned circular perforations between said groups of wires and of semi-circular notches along the longitudinal edges of the cable in transverse alignment with the perforations, said perforations and notches having the same radius of curvature as and disposed so as to correspond with the pin-receiving bores and spacer pads of a cooperable connector assembly, said small copper wires being disposed within the cable with respect to the perforations and notches so as to correspond with the connector elements of a cooperable connector assembly, said plastic being characterized by being readily penetrated and displaced by said connector elements during pressure assembly on said cable of said connector assemblies.

References Cited by the Examiner

UNITED STATES PATENTS

| | | | |
|---|---|---|---|
| 1,324,994 | 12/1919 | Benjamin | 174—92 X |
| 1,784,217 | 12/1930 | Berry | 174—117 |
| 2,124,943 | 7/1938 | Bennett | 339—107 |
| 3,034,091 | 5/1962 | Gluck | 339—103 |
| 3,065,446 | 11/1962 | Robb et al. | 339—184 |

JOSEPH D. SEERS, *Primary Examiner.*

W. DONALD MILLER, *Examiner.*